Nov. 11, 1969   IWAO MITSUISHI ETAL   3,477,779
VISUAL ACUITY TESTING EQUIPMENT
Filed Dec. 29, 1965   2 Sheets-Sheet 1
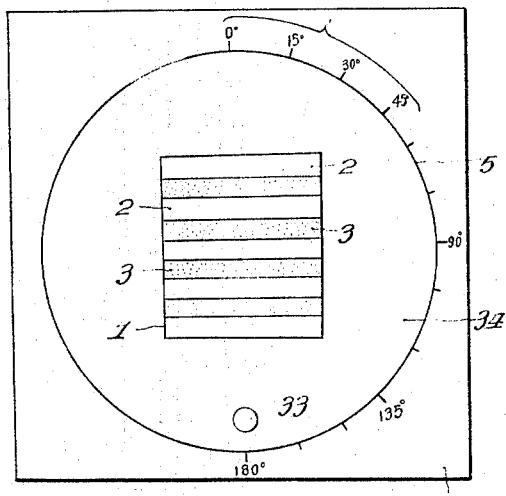
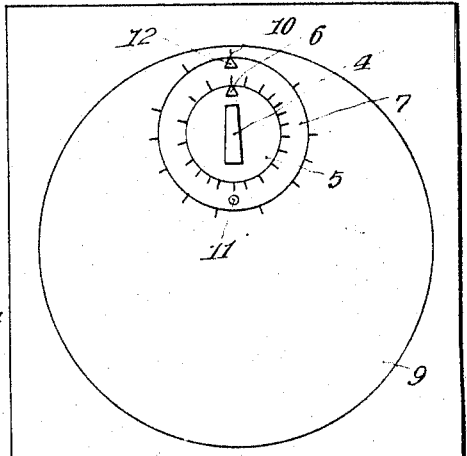
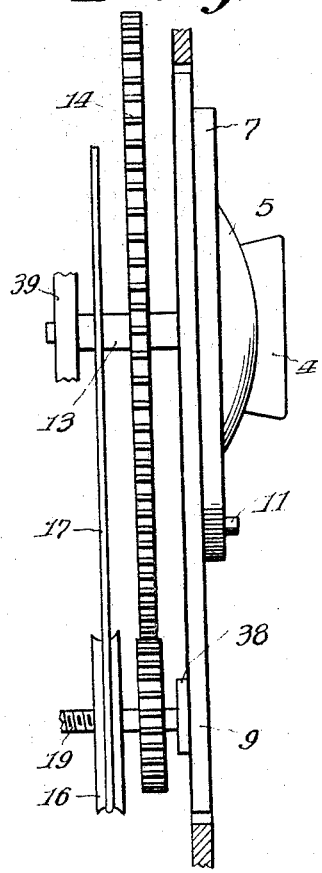
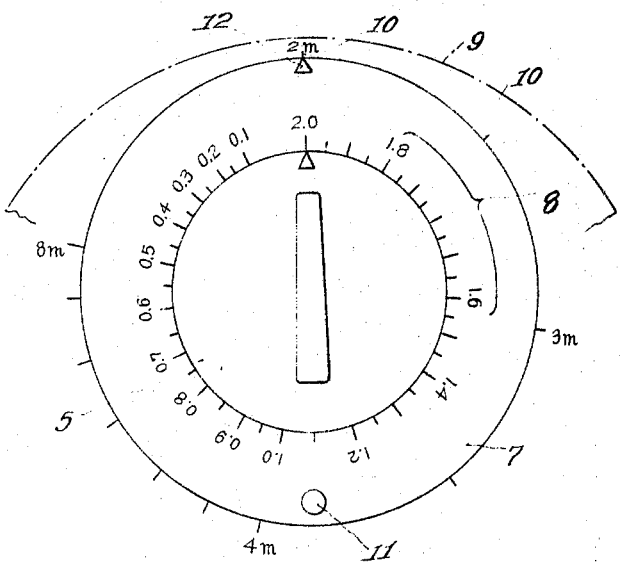
INVENTOR.
IWAO MITSUISHI
BY TADAYOSHI AKITA
Eyre, Mann & Lucas

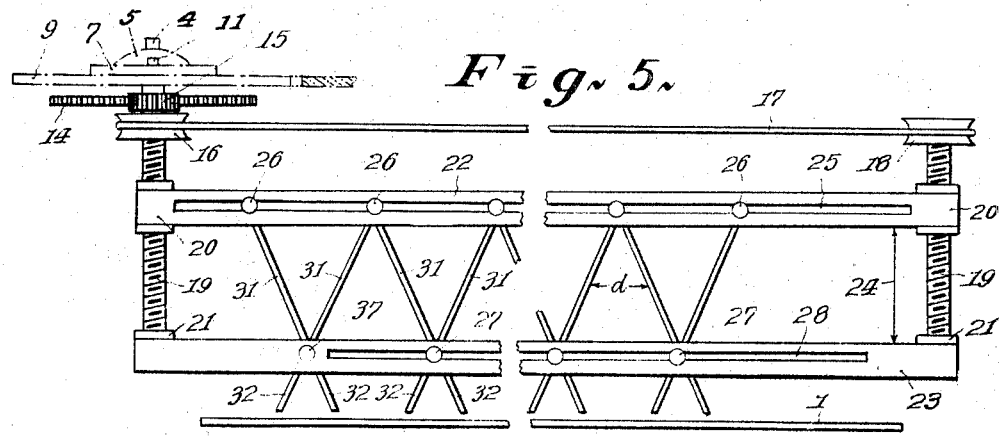
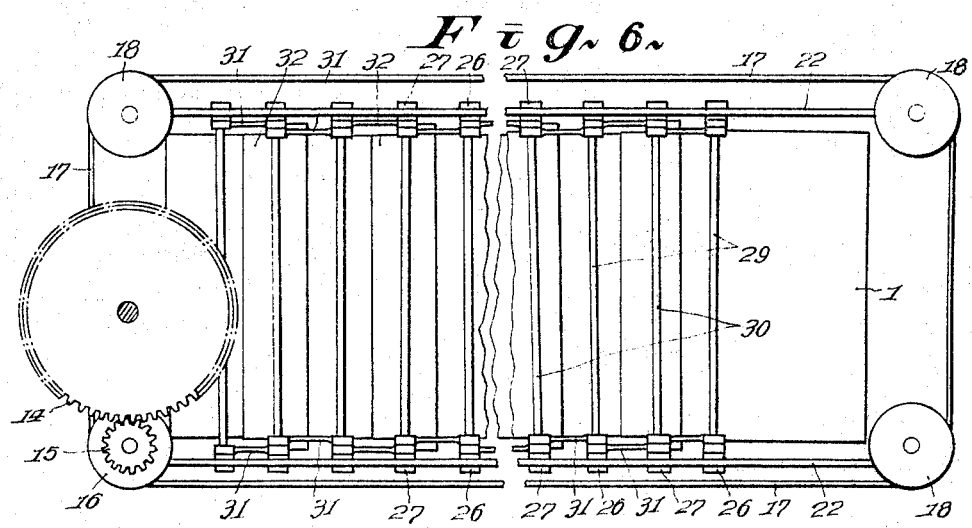
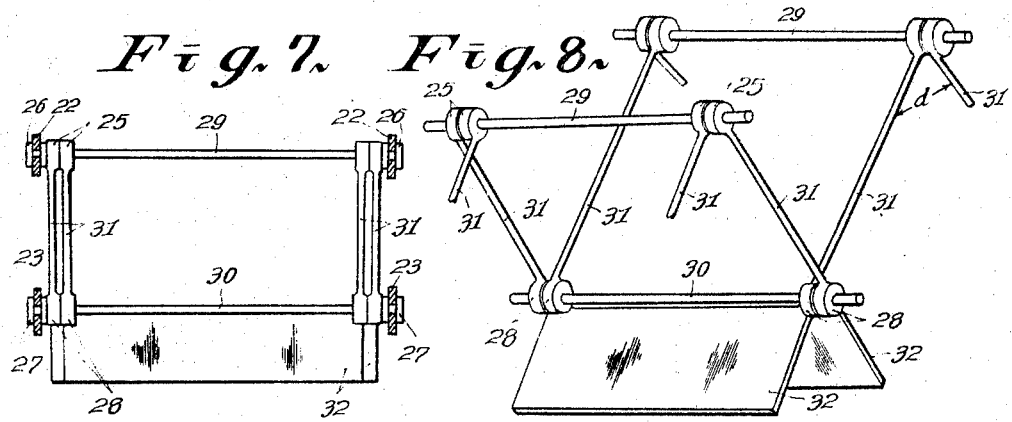

United States Patent Office 3,477,779
Patented Nov. 11, 1969

3,477,779
VISUAL ACUITY TESTING EQUIPMENT
Iwao Mitsuishi, 1–41 Kotake-cho, Nerima-ku, and Tadayoshi Akita, 436 Seijo-machi, Setagaya-ku, both of Tokyo, Japan
Filed Dec. 29, 1965, Ser. No. 517,368
Int. Cl. A61b 3/02
U.S. Cl. 351—32                                    4 Claims

ABSTRACT OF THE DISCLOSURE

A method and apparatus are provided for measuring visual acuity by projecting a plurality of equal width light and dark parallel lines on a screen and varying the width of these lines to ascertain the minimum width line resolvable by the subject without changing the equality of width between the light and dark parallel lines. The apparatus for accomplishing this consists of a plurality of screen plates movably mounted to a set of rails with a second set of rails positioned above the first set, the screen plates also being mounted to the second set of rails via a plurality of rods, whereby when said second set of rails is moved away from said first set of rails, said screen plates are moved such that the width of light and dark parallel lines appearing on the screen is changed without changing the equality of width of the light and dark parallel lines.

---

The present invention relates principally to a device intended to test visual acuity. The device employs light and dark lines in parallel relationship, the width of said lines being adjustable as well. The device also comprises a plurality of parallel light screening plates, the width of light screening area of said light screening plates being adjustable by means of a combined rod mechanism. The purpose of the invention is to provide a device by which visual acuity testing can be accomplished more accurately and efficiently as compared to a conventional visual acuity testing method employing a chart containing a group of letters and figures of various sizes and making a subject observe and interpret such chart at a certain distance.

The conventional visual testing method consists of making a subject view and decipher at a certain distance a chart in which letters and figures of various sizes are arranged. Visual acuity is a kind of resolving power and is expressed as the reciprocal of a number expressing in the unit of minutes the angle formed by 2 straight lines connecting 2 adjoining points to the center of the pupil. Accordingly, in the case of charts for conventional visual acuity testing two, adjacent points within the letters and figures play an important role. However, the question of what are 2 adjacent points required, for instance, for deciphering the letter $a$ is not simple. As an example of this, cases may be encountered, in which among a number of letters intended to yield a visual acuity of 0.7, a particular letter can be read while others cannot be read. The present invention eliminates such defects and can achieve a test more accurately and efficiently.

In a device developed under the present invention, parallel lines are employed to simplify the measurement of distance between two adjoining points, instead of using letters or figures. That is to say, its principle lies in that parallel lines themselves are provided with width, and visual acuity is measured in adjusting such width and determining the limit of resolvable width. Moreover, a question of whether resolving power takes effect under positive or negative stimulus from light is eliminated by making the width of dark lines equal to the width of bright lines lying between the dark lines.

In the case of visual acuity testing using a break in Landolt's ring, a target is employed in which a circle having a break at one position is drawn in solid line on a sheet of white paper. Let it be assumed that the width of such break is $a$ and the distance between the break and the eye to be subjected to visual testing is $d$, then visual acuity will be proportional to $d/a$. Accordingly, in the case of visual acuity testing employing such target, the only important quantity is the width of break or $a$. Other points, for instance, the thickness of the line constituting the circle, the value of the diameter of the circle, etc. are not important quantities in principle. In other words, the target for visual acuity testing utilizing a break in Landolt's ring is not composed of indispensable elements only. Secondly, under this system of testing, a subject may only point out the position of break. Since, however, the ordinary testing means is a piece of printed matter, it is impossible to change the position of the break. Accordingly, it is possible to point out the correct position of the break on the basis of memory. In a system in which Landolt's ring is made to revolve, having recourse to memory is ineffective, but such a system is still inconvenient if the direction of visual acuity as in the case of astigmatism is taken into account.

The testing method according to the present invention consists in counting the number of dark or bright lines and not in detecting the position of a break and therefore, the role played by memory is completely eliminated. Further, the width of bright and dark lines are always equal to each other and their value corresponds to the aforementioned $a$. Consequently, the only element which is independent of visual acuity is the length $l$ of these lines. Being different from the thickness of line or diameter of Landolt's ring, the length $l$ of these lines does not materially stimulate the sense of vision of a subject. In another method, an ordinary test target utilizing a break in Landolt's ring is provided with a plurality of breaks, each one being different in size than the others, by means of which visual acuity is obtained stepwise as a discontinuous quantity whereas in the test method of the present invention, the width of bright or dark lines is changed continuously and therefore, it is possible to measure visual acuity non-stepwise as a continuous quantity.

The attached drawings indicate a preferred embodiment of the present invention: FIG. 1 represents a front exterior view of the visual acuity testing equipment according to the present invention, FIG. 2 is a rear sectional view of FIG. 1 showing in detail an accommodation measuring part, FIG. 3 is a top view of FIG. 1 showing the relation between the accommodation measuring part of FIG. 2 and the interior of the device, FIG. 4 the rear view of the equipment, FIGS. 5, 6 and 7 are sectional views of the operating parts with FIG. 7 representing the side elevation of the right hand side of FIG. 5 and FIG. 5 is a side view of the device lying face down and FIG. 6 is a rear view of the device lying on its side and FIG. 8 the oblique section of a part of the operating mechanism of FIGS. 5–7.

As illustrated in FIG. 1, the equipment according to the present invention is provided with a rectangular window 1. This window consists of an illumination plate made of material such as frosted glass which possesses the property of being able to scatter the penetrating light. The width of bright line 2 and that of dark line 3 can be changed by operating the handle 4 provided on the back (FIGS. 2, 3 and 4) of this equipment. The width of bright line 2 and that of dark line 3 are always maintained equal to each other. If these lines are enlarged in width, the number of bright lines 2 appearing on the illumination plate 1 decreases and if the width is made smaller, the number of bright lines 2 increases. If, in the case of visual acuity testing, the number of bright lines 2 is so large as to exceed the resolving power of the eye of a subject, the subject will not be able to count the number of bright lines 2. In such case, the examiner slowly turns the handle 4 indicated in FIG. 2 clockwise and the number of bright lines 2 appearing on the illumination plate 1 gradually decreases for reasons described hereinafter and their width is gradually enlarged until a condition is brought about, in which the resolving power of eye can distinguish the lines and the number of bright lines can be counted. If, in this case, the interval 8 on the index plate 7 as pointed to by an index 6 engraved in the disc 5 which revolves together with the handle 4 is read, it represents the visual acuity. The distance between a subject and the equipment is indicated on the scale 10 of back plate 9 of the index plate 7 and by means of the knob 11, the index 12 on the index plate 7 is made to point to the scale 10. In both cases where the disc 5 is turned by the handle 4 and the index plate 7 is turned by means of knob 11, the shaft 13 revolves and at the same time, the gear 14 fixed to said shaft turns and causes the gear 15 engaged with it to turn. As a result, the pulley 16 fixed to the shaft of gear 15 turns and its motion is, as illustrated in FIGS. 5 and 6, transmitted by way of the belt 17 to 3 additional pulleys 18. As the screw axles 19 are fixed respectively to these 4 pulleys 16, 18, the revolution of pulleys 16, 18 causes the revolution of the respective screw axles 19 and the floating elements 20 mounted to the respective screw axles move up and down correspondingly. The receiving member 21 rotatably receives the screw axles 19. As the vertical movement of these floating elements 20 is effected simultaneously by all 4 of the pulleys, the rails 22 connected therewith change their height 24, while being maintained parallel to the lower stationary rails 23. The rails 22 are provided with grooves 25 in which a plurality of rollers 26 are supported in a movable condition. The same applies to the rails 23, in which case a plurality of rollers 27 are supported in a movable condition in the grooves 28. As illustrated in FIG. 6, the rails 22 consist of 2 parallel rails. The rollers 26 are mounted in rails 22 in opposed relationship and are linked together by tie rods 29. Similarly, in the case of the rails 23, a pair of corresponding rollers 27 are linked together by tie rods 30. These tie rods 29, 30 are connected, as clearly illustrated in FIGS. 7 and 8, in turn by the rods 31 which are equipped with floating terminal 25, 28. If the interval $d$ of these rods 31 is changed, the angle of inclination with respect to the rails 22 or 23 is changed. As a result, the interval between adjacent rollers 27 varies. The lower floating terminal 28 of rod 31 is provided with a plate 32 as illustrated. The plate 32 is a screen plate which interrupts light and extends downwards for a distance equivalent to about half of the length of rod 31. Consequently, the lower edge of light screen plate 32 are parallel to each other and are spaced at equal interval as illustrated in FIG. 6. If the light is emitted from the light source (not illustrated) placed at a position above FIGS. 7 and 8, the portion shaded by the screen plate 32 becomes dark and therefore, bright lines 2 and dark lines 3 having the same width appear in parallel and alternately on the illumination plate 1 as illustrated in FIG. 1. The visual acuity of a subject is not always independent of the direction of bright and dark parallel lines 2, 3. Such being the case, after completion of examination in a certain direction, the knob 33 of FIG. 1 is operated to turn the disc 34 and the subject is moved such that the direction of the light and dark parallel lines will change their direction with respect to the subject by the angle indicated by the scale 36 on external case 35, whereupon visual acuity is tested in the aforementioned manner. Thus, if the directions of maximum and minimum visual acuity are found and the visual acuity in each direction is examined accurately, not only the direction of astigmatism can be found, but also the degree of astigmatism can be evaluated without employing the conventional trial and error method. Of the rollers 27, the one 37 located at the left end in FIG. 5 is fixed to the rail 23 and does not move. 38 represents the bearing of the pulley 16 and 39 the bearing of the shaft 13.

As described above, the present invention pertains principally to a device intended for visual acuity testing which employs bright and dark lines placed in parallel and adjustable in width as well as a device equipped with a plurality of parallel light screening plates, with the width of light screening area of said light screening plates being adjustable by means of a combined rod mechanism. Therefore, as compared with a conventional visual acuity testing method employing a chart containing a group of letters and figures of various sizes and making a subject observe and decipher such chart at a certain distance, it has the effect that visual acuity testing can be accomplished more accurately and efficiently.

What we claim is:

1. A visual acuity testing device comprising; a screen, means for directing light upon one side of said screen, means for partially blocking said light to establish alternating light and dark parallel lines upon one side of said screen, said lines being of equal width, and means for varying the width of all of said lines simultaneously while maintaining said equality of width between said lines, the means for partially blocking said light falling on said screen and for varying said equal width light and dark parallel lines being respectively a plurality of screen plates placed on one side of said screen to partially block said light falling on said screen to form said plurality of equal width light and dark parallel lines on said screen and at least two sets of rails, each one of said sets comprising at least two rails parallel to each other and lying in a plane parallel to said screen, one of said sets being closer to said screen than the other set(s), each of said rails having a groove therein of predetermined length, a plurality of rollers mounted in each groove, said screen plates being mounted to the rollers of the set of rails closest to said screen, whereby said screen plates are closer to said screen than said closest set of rails, each roller being moveably mounted in the grooves of said rails with each roller of one set being connected to a corresponding roller of the other said set(s), and means for changing the distance between each of said sets of rails whereby when said distance between said sets is changed, the width of said light and dark lines on said screen is correspondingly changed without changing the equality of width of said light and dark parallel lines.

2. A visual acuity testing device as specified in claim 1 wherein said closest set of rails is positionally fixed relative to said screen, and said other set of rails are mounted to a rotatable screw, said screw being rotatably mounted to the end of said closest set of rails whereby when said screw is rotated, the distance between said sets of rails is changed by movement of said other sets along the axis of said screw.

3. A visual acuity testing device as specified in claim 2 further comprising a scale and a disc, said disc having a handle and an index affixed thereto, said disc being fixedly mounted to said screw whereby when said screw is rotated via said handle and disc, the value of visual acuity as pointed to by said index is read directly from said scale.

4. A visual acuity testing device as specified in claim 2 further comprising a moveable plate mounted to said screen whereby when said plate is rotated and when the patient is moved in predetermined relation to the rotation of said plate, visual acuity in different directions and the direction and value of astigmatism are measured.

References Cited

UNITED STATES PATENTS

| | | | |
|---|---|---|---|
| 1,174,547 | 3/1916 | Clason | 351—30 |
| 1,369,136 | 2/1921 | Shigon | 351—34 |

DAVID SCHONBERG, Primary Examiner

PAUL A. SACHER, Assistant Examiner

U.S. Cl. X.R.

351—34, 36